United States Patent [19]

Teraoka

[11] Patent Number: 5,394,853
[45] Date of Patent: Mar. 7, 1995

[54] SUPERCHARGING DEVICE FOR AN INTERNAL COMBUSTION ENGINE

[75] Inventor: Masao Teraoka, Tochigi, Japan

[73] Assignee: Tochigi Fuji Sangyo Kabushiki Kaisha, Japan

[21] Appl. No.: 51,451

[22] Filed: Apr. 21, 1993

[30] Foreign Application Priority Data

Apr. 22, 1992 [JP] Japan .................................. 4-101481
Apr. 28, 1992 [JP] Japan .................................. 4-110052

[51] Int. Cl.⁶ .......................................... F02B 33/00
[52] U.S. Cl. .................................... 123/561; 474/13; 474/18
[58] Field of Search ............... 123/561; 474/13, 14, 474/15, 18, 28, 46

[56] References Cited

U.S. PATENT DOCUMENTS

| | | | |
|---|---|---|---|
| 3,052,132 | 9/1962 | Dittrich et al. | 474/18 |
| 4,229,988 | 10/1980 | Rattunde | 474/28 |
| 4,360,353 | 11/1982 | Hattori et al. | 474/46 |
| 4,563,997 | 1/1986 | Aoki | 123/561 |
| 5,117,799 | 6/1992 | Suzuki et al. | 123/561 |

FOREIGN PATENT DOCUMENTS

| | | |
|---|---|---|
| 1-69400 | 5/1989 | Japan . |
| 1-113518 | 5/1989 | Japan .................................. 123/561 |
| 3-3925 | 1/1991 | Japan .................................. 123/561 |
| 3-500564 | 2/1991 | Japan . |

*Primary Examiner*—Richard A. Bertsch
*Assistant Examiner*—Charles G. Freay
*Attorney, Agent, or Firm*—Graham & James

[57] ABSTRACT

A supercharging device for an internal combustion engine for which the load can be changed by an accelerator pedal includes: a continuously variable transmission being driven by the engine and including a drive pulley, a driven pulley, a belt, a flyweight, and a presser member, the drive and driven pulleys having movable flanges and fixed flanges mounted on rotatable shaft members and being rotatable therewith, the belt being wound around and coupling the drive and driven pulleys, and the flyweight and the presser member being provided on at least one of the drive pulley and the driven pulley; and a mechanical type supercharger driven by the continuously variable transmission for supercharging the engine, the supercharger having a housing and a runner shaft with a runner rotatably supported inside the housing. A control device is provided for sliding the movable flange of the drive pulley along the axis thereof so that the movable flange is moved away from the fixed flange in the drive pulley when under a light load for which the supercharger requires little supercharging.

8 Claims, 5 Drawing Sheets

SUPERCHARGING DEVICE FOR AN INTERNAL COMBUSTION ENGINE

BACKGROUND OF THE INVENTION

The present invention relates to a supercharger device for supercharging an internal combustion engine to increase the output level thereof, and more particularly, to a supercharging device comprising a mechanical type supercharger of which the rotational frequency is regulated by a belt type continuously variable transmission which uses the centrifugal force of a flyweight provided therein.

A conventional mechanical type supercharger whose rotational frequency is controlled by a belt type continuously variable transmission (often abbreviated to CVT) which uses the centrifugal force of a flyweight provided therein has been disclosed in the official announcement Hei 3-500564 which is the Japanese translated one of the international publication No. W089/02521. In this supercharger, a runner shaft with a runner is rotatably supported inside a housing. In order to supercharge the internal combustion engine, the runner shaft is driven by a secondary pulley device (a driven pulley device) of the continuously variable transmission which is driven by the internal combustion engine through an electromagnetic clutch and a speed increasing gear device.

Although the above identified application does not disclose a primary pulley (a drive pulley) of a continuously variable transmission, a primary pulley as well as a secondary pulley in a continuously variable transmission is disclosed in Japanese Utility Model Application Laid Open (Prepublicatlon) No. 1-69400 (1989). In this transmission, the drive pulley and the driven pulley each comprise a mutually opposed fixed flange (disk) and a movable flange. The fixed flanges of the drive pulley and the driven pulley are arranged on relative opposite sides. The movable flanges serve to vary the widths of V-shaped grooves of the drive pulley and the driven pulley. A flyweight for generating a centrifugal force is provided in at least one of the drive pulley and the driven pulley. Also, a spring for generating a force against the centrifugal force is provided in at least one of the drive pulley and the driven pulley.

In the above-described supercharger, even when the engine speed varies, if the engine speed is within a predetermined range, the rotational frequency of the supercharger can be controlled by the continuously-variable transmission so as to be maintained substantially constant. Moreover, only under a heavy load condition which requires the supercharger to be operated, the supercharger is operated while receiving power transmitted through an electromagnetic clutch to improve engine performance, i.e., driving ability. Namely, once the engine speed reaches a certain level, the conventional mechanical type supercharger with the CVT of a centrifugal weight type is controlled so that the rotational frequency of the supercharger is maintained at a predetermined constant level, regardless of the load on the internal combustion engine.

However, because of the above described device, even under partial load conditions or relatively light load conditions which require no supercharging, the rotational frequency of the supercharger reaches the predetermined constant level, i.e., a high rotational frequency level, thereby causing inefficient fuel consumption.

Further, although the electromagnetic clutch is employed to cut off the power transmitted to the supercharger under the partial load condition, the driving ability is unfavorably affected by on/off operation of the electromagnetic clutch in response to the variation in the load, thereby causing poor driving conditions. Consequently, the cutoff range has to be narrow, thereby resulting in poor fuel consumption.

SUMMARY OF THE INVENTION

In view of the above, an object of the present invention is to solve the aforementioned problems in the prior art through the introduction of a supercharging device for an internal combustion engine which has reduced influence upon driving ability as well as improved fuel consumption.

The afore-mentioned object of the present invention is accomplished through a supercharging device for an internal combustion engine comprising: a belt type continuously variable transmission being driven by the engine, the transmission including a drive pulley, a driven pulley, a belt, a flyweight, and a presser member, the drive and driven pulleys having movable flanges and fixed flanges mounted on rotatable shaft members and being rotatable therewith, the belt being wound around and coupling the drive and driven pulleys, and the flyweight and the presser member being provided on at least one of the drive pulley and the driven pulley; a mechanical type supercharger driven by the continuously variable transmission for supercharging the engine, the supercharger having a housing and a runner shaft with a runner rotatably supported inside the housing; and control means for sliding the movable flange of the drive pulley along the axis thereof so that the movable flange is moved away from the fixed flange in the drive pulley when under a light load for which the supercharger requires little supercharging.

In the above-mentioned supercharging device, under the partial load condition or the light load condition during normal operation, the movable flange of the drive pulley which may be pressed by the presser member is caused to slide by the control means against the force of the presser member to increase a width of a V-shaped groove defined between the fixed flange and the movable flange. Accordingly, the supercharger is driven by the continuously variable transmission in a speed-reducing mode or a low rotational frequency mode which has an intermediate rotational frequency. On the other hand, under heavy load conditions during normal operation, the movable flange of the drive pulley is caused to slide toward the fixed flange to reduce the width of the V-shaped groove. In this event, the supercharger is operated at a maximum rotational frequency within a predetermined range while supercharging the internal combustion engine. Transition from the low rotational frequency mode to a high rotational frequency mode and vice versa in the CVT can be said to include transition from the intermediate rotational frequency to the maximum rotational frequency and vice versa. Thus, any shock which occurs when the power transmitted to the supercharger is cut off can be avoided, therefore the driving conditions can be improved.

DETAILED DESCRIPTION OF THE PREFERRED EMBODIMENTS

Supercharging devices according to the present invention will be described hereinafter with reference to FIGS. 1-8. The below described right and left sides or directions and the downward direction correspond to the right and left sides or directions and the downward direction in FIGS. 1, 4, 6, and 8. Further, members with the same reference numerals throughout FIGS. 1-8 should be considered the same or similar members.

FIRST EMBODIMENT

Figure 1:
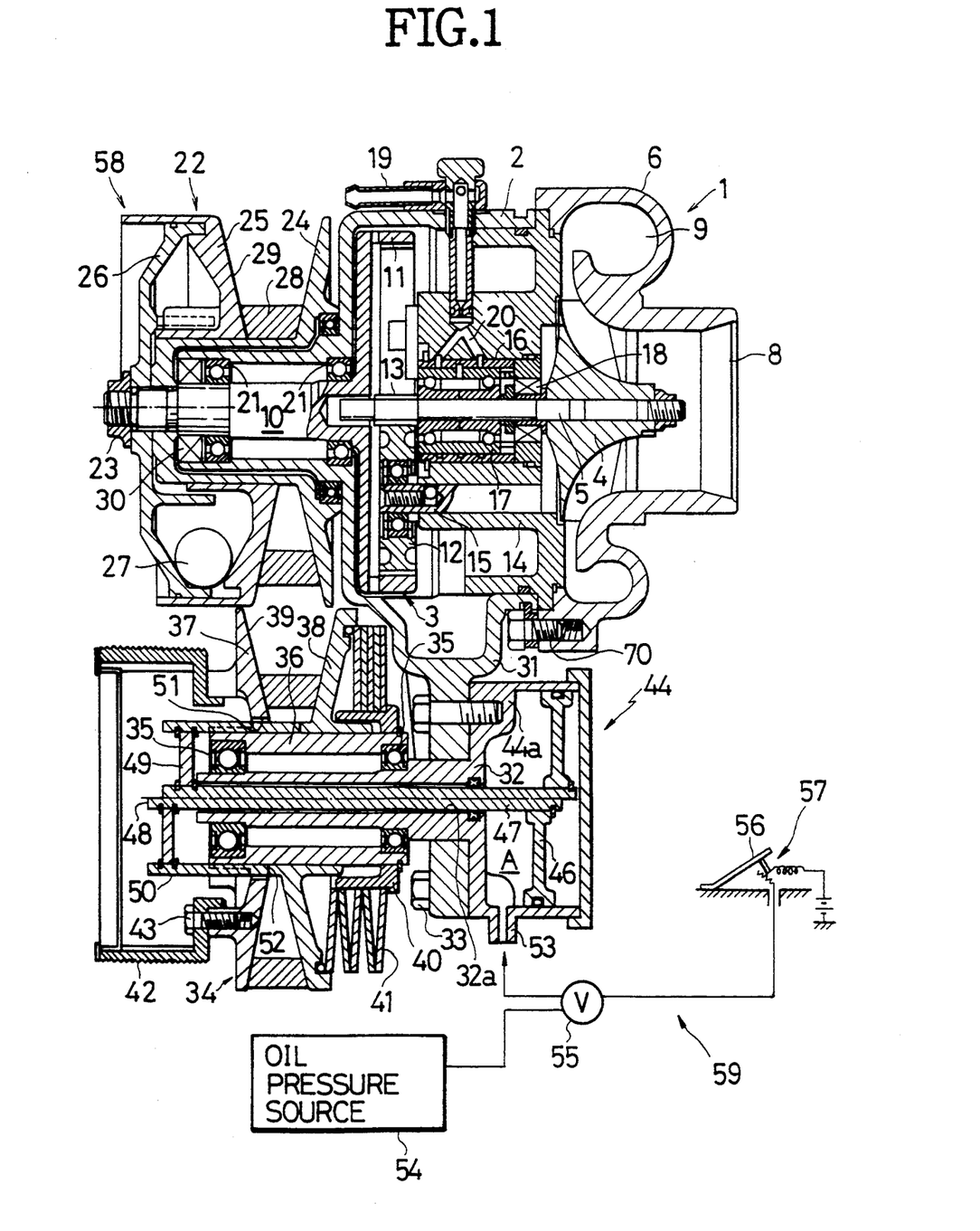
FIG. 1 is a sectional view of a supercharging device for an internal combustion engine according to a first embodiment of the invention.
Figure 2:
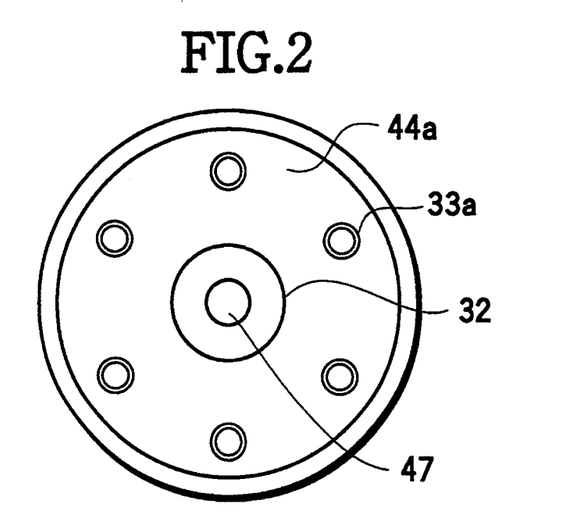
FIG. 2 is an explanatory view of a part of an actuator illustrated in FIG. 1.
Figure 3:
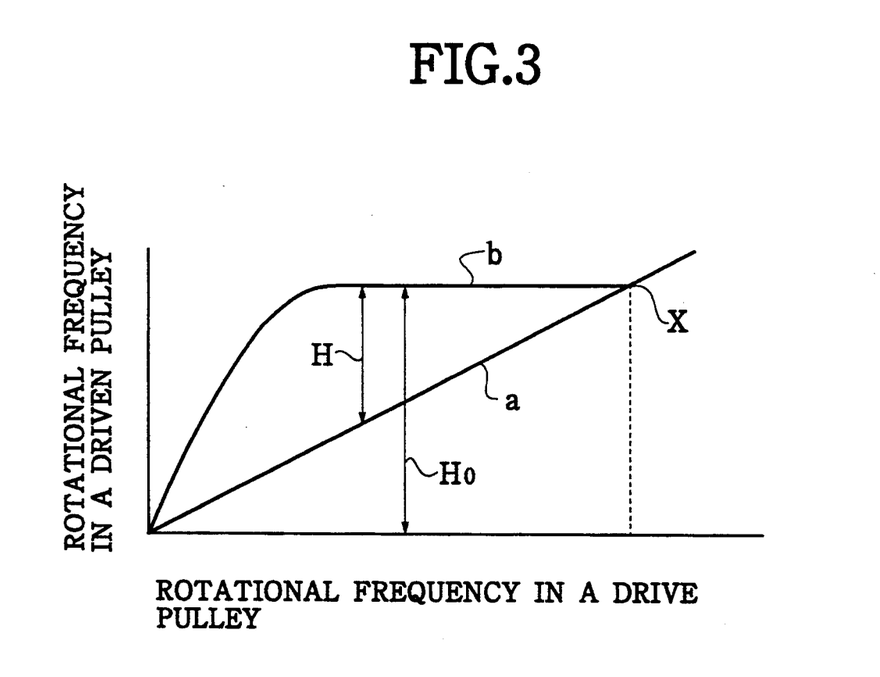
FIG. 3 is a line graph showing a relationship between rotational frequencies in a drive pulley and rotational frequencies in a driven pulley illustrated in FIG. 1.

Referring to FIGS. 1-3, a first embodiment according to the invention will be described hereinafter.

First, a structure of a supercharging device will be described. The mechanical supercharger 1 has a housing 2 mounted on an assembly such as an internal combustion engine which is not shown. A speed increasing gear device 3 and a runner shaft 5 with a runner 4 are accommodated in the housing 2. The housing 2 is integrally coupled with a shroud 6 by a bolt 70. The shroud 6 has a horizontally extending cylinder such as an air inlet 8 and an air outlet 9 having a spiral shape.

The acceleration gear device 3 comprises an internal gear 11 integrally formed with an input shaft 10, a pair of pinions 12, and a sun gear 13. Each of the pinions 12 is rotatably supported on a shaft 15. The shaft 15 is supported by a boss 14 which is secured between the housing 2 and the shroud 6. Although only one is shown in the figure, both of the pinions 12 are engaged with the sun gear 13 and the internal gear 11. The sun gear 13 is integrally formed with the runner shaft 5 and is rotatably supported on the boss 14 through a double row angular contact ball bearing 16 and a spacer 17. The runner shaft 5 is provided with a mechanical seal 18 on the rear side of the runner 4. The ball bearing 16 is supplied with lubricating oil through a branch shaped path 20 from a lubricant supply pipe 19 formed at the top of the housing 2.

The input shaft 10 is rotatably supported in the housing 2 through two ball bearings 21 and 21 on the left side of the housing 2.

The input shaft 10 is integrally coupled with a driven pulley 22 by a nut 23 on its left side. The driven pulley 22 has a fixed flange 24 and a movable flange 25 on the right side and the left side of the driven pulley 22, respectively. The fixed flange 24 is secured to the input shaft 10. The movable flange 25 is movable in the axial direction of the input shaft 10 with respect to the fixed flange 24. A V-shaped groove 29 into which a belt 28 is received is formed between the fixed flange 24 and the movable flange 25. A flyweight 27 for generating a centrifugal force is held between the rear surface of the movable flange 25 and a conical plate 26 which is secured to the input shaft 10. In FIG. 1, a reference numeral 30 represents an oil seal. The upper and lower halves of the drive pulley 22 in FIG. 1 are illustrated in a widened state in which the V-shaped groove 29 is widened and in a narrowed state in which the V-shaped groove 29 is narrowed, respectively.

The housing 2 has a flange 31 extending downwards. A fixed shaft 32 extends from the flange 31 to the left. Further, the fixed shaft 32 is integrally formed with an airtight cylinder 44a (which will be described below) and is secured to the flange 31 through bolts 33. A drive pulley 34 is rotatably supported on the fixed shaft 32 through ball bearings 35 and 35. The drive pulley 34 has a fixed flange 37 and a movable flange 38 on the left side and the right side, respectively. A V-shaped groove 39 into which the belt 28 is received is formed between the fixed flange 37 and the movable flange 38. Thus, the belt 28 is wound around and couples the drive pulley 34 and the driven pulley 22.

The fixed flange 37 is secured at a specific position upon the fixed shaft 32. Further, the fixed flange 37 is integrally formed with a cylindrical portion 36 which holds outer races of the ball bearings 35 and 35 so that the fixed flange 37 is rotatable at the specific position.

An end plate 40 is positioned between the rear surface of the movable flange 38 and the cylindrical portion 36. A presser member, for example, a disk spring 41 comprising five plates, is provided adjacent to the movable flange 38 so that the movable flange 38 can be pressed by the disk spring 41 and is movable along the axis of the fixed shaft 32. The left side of the fixed flange 37 is secured by a bolt 43 to a pulley 42 which has a flat belt and is driven by a crankshaft of the internal combustion engine. Thus, a continuously variable transmission 58 is made up of the drive pulley 34 with the disk spring 41; the driven pulley 22 with the flyweight 27; and the belt 28. In FIG. 1, the V-shaped groove 39 is shown in a widened state and in a narrowed state above and below a dot-and-dashed line, respectively. The V-shaped groove 39 is pressed by the disk spring 41 into the narrowed state.

The airtight cylinder 44a which is a part of an actuator 44 is integrally formed with the right side of the fixed shaft 32. The airtight cylinder 44a has a cylindrical part for which the axis is the same as that of the fixed shaft 32 as shown in FIG. 2. (In FIG. 2, the reference numeral 33a represents six female screw holes which are equally spaced on the face of the airtight cylinder 44a.) The actuator 44 includes a piston 46 and a rod 47. The piston 46 is provided inside the airtight cylinder 44a and is connected to the right side of the rod 47. The rod 47 extends through a center hole 32a of the fixed shaft 32 along the fixed shaft 32. The left side of the rod 47, i.e., a left end 48, is coupled with a cylinder 50 which extends along the cylindrical portion 36 through a thrust bearing 49. The cylinder 50 extends from the thrust bearing 49 to the right while penetrating an aperture 51 of a circular boss of the fixed flange 37. The right side of the cylinder 50 abuts against an abutting face 52 of the movable flange 38. A left chamber A which is formed on the left side of the piston 46 inside the airtight cylinder 44a of the actuator 44 has an inlet 53. A pressurized oil from an oil pressure source 54 is supplied through a valve 55 to the left chamber A through the inlet 53. The valve 55 is connected to a regulator 57 which controls the degree of opening of the valve 55 based on the setting of an accelerator pedal 56. Specifically, the regulator 57 controls the valve 55 so that the degree of opening of the valve 55 is large when the set angle of the accelerator pedal 56 is small, namely when under a light load for which the supercharger requires little supercharging. Further, the amount of the pressurized oil supplied to the airtight cylinder 44a becomes small in response to an increase in the load on the internal combustion engine. Thus, a maximum amount of the pressured oil is supplied under a light load and no pressurized oil is supplied under a heavy load for which the supercharger requires supercharging.

As described above, the actuator 44, the oil pressure source 54, the valve 55, and the regulator 57 serve to change the rotational frequency of the supercharger 1 while controlling the force of the disk spring 41 provided in the drive pulley device 34 under light or heavy load conditions. Thus, the combination of these components forms a supercharging device 59 for controlling the continuously variable transmission 58.

Next, operation of the first embodiment will be explained with reference to FIG. 3 as well as FIG. 1 and 2.

While the engine is operated, under a light load in which the set angle of the accelerator pedal 56 is small, the valve 55 is controlled by the regulator 57 so as to be fully opened, whereby the maximum amount of pressurized is supplied from the oil pressure source 54 to the left chamber A of the actuator 44 through the valve 55 and the inlet 53. Consequently, the piston 46 moves to the right while drawing the rod 47 in the same direction as shown by the upper half above a dot-and-dashed line in the rod 47 in FIG. 1. Further, the cylinder 50 presses the movable flange 38 of the drive pulley 34 to the right, while contracting the disk spring 41 into a substantially vertical position. Accordingly, the V-shaped groove 39 of the drive pulley 34 is widened to provide a small diameter while the V-shaped groove 29 of the driven pulley 22 is narrowed to provide a large diameter. Thus, the driven pulley 22 is driven in a speed-reducing mode or in a low rotational frequency mode. In this state, while the rotational frequency of the drive pulley 34 increases, the rotational frequency of the driven pulley 22 substantially increases proportionally and reaches a point X, as depicted by an oblique line a in FIG. 3.

Under a light load, since the driven pulley 22 provides a low rotational frequency, the supercharger 1 is operated at a low rotational frequency and therefore requires a small driving torque. Thus, fuel efficiency is improved.

Under a heavy load corresponding to a large set angle of the accelerator pedal 56, the regulator 57 causes the valve 55 to completely close. No hydraulic pressure is supplied to the actuator 44 . Accordingly, the piston 46 moves to the left together with the rod 47. The movable flange 38 of the drive pulley 34 moves to narrow the V-shaped groove 39 in response to the force of the disk spring 41 as shown in the lower half of the drive pulley 34 in FIG. 1.

Then, the V-shaped groove 29 of the driven pulley 22 is widened as shown in the upper half of the driven pulley 22 in FIG. 1. As a result, the driven pulley 22 is controlled in a speed-increasing mode or in a high rotational frequency mode, as depicted by a line b in FIG. 3 at zero hydraulic pressure.

Thus, the supercharger 1 supercharges the internal combustion engine as a result of the high rotational frequency of the driven pulley 22, the input shaft 10, the speed-increasing gear device 3, the sun gear 13, the runner shaft 5, and the runner 4 to increase the output level of the engine. The high rotational frequency is determined in balance with the forces of the flyweight 27 and the disk spring 41 and is kept within a predetermined range.

In this embodiment, transition from the light load to the heavy load and vice versa only requires a difference H between the lines a and b in FIG. 3 and is continuously executed. Accordingly, shock due to speed variation is suppressed, thereby improving the driving condition.

On the other hand, since a conventional supercharger with an electromagnetic clutch requires a difference $H_o$ between zero to the line b in FIG. 3, considerable shock is produced to adversely affect the driving condition.

As described above, the normal operation, including the light load and the heavy load conditions, is indicated by an area between the lines a and b in FIG. 3.

In the above described first embodiment, since the airtight cylinder 44a of the actuator 44 is integrally formed with the fixed shaft 32, securing the fixed shaft 32 to the flange 31 of the housing 2 saves securing the airtight cylinder 44a to the housing 2, thereby facilitating securing members and providing a small, light, and inexpensive device. In addition, there is no need of center alignment between the airtight cylinder 44a and the fixed shaft 32 since the airtight cylinder 44a and the fixed shaft 32 are formed so that the centers thereof mutually correspond.

SECOND EMBODIMENT

Figure 4:
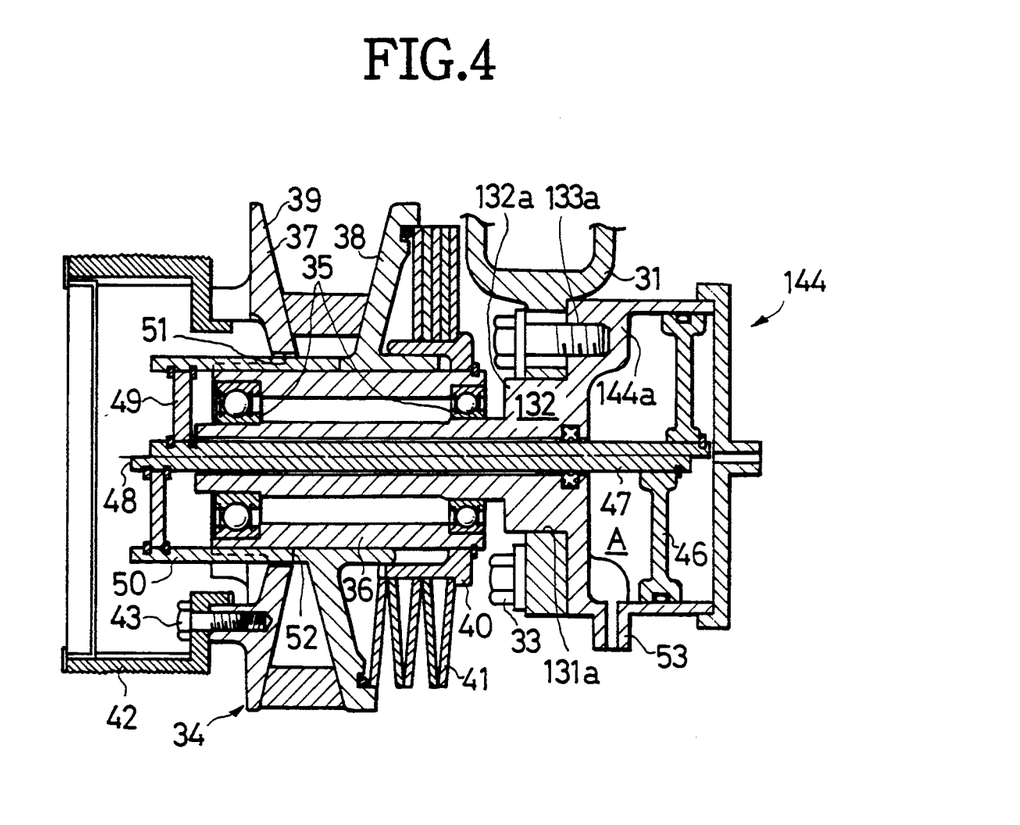
FIG. 4 is a sectional view of a part of a supercharging device according to a second embodiment of the invention.
Figure 5:
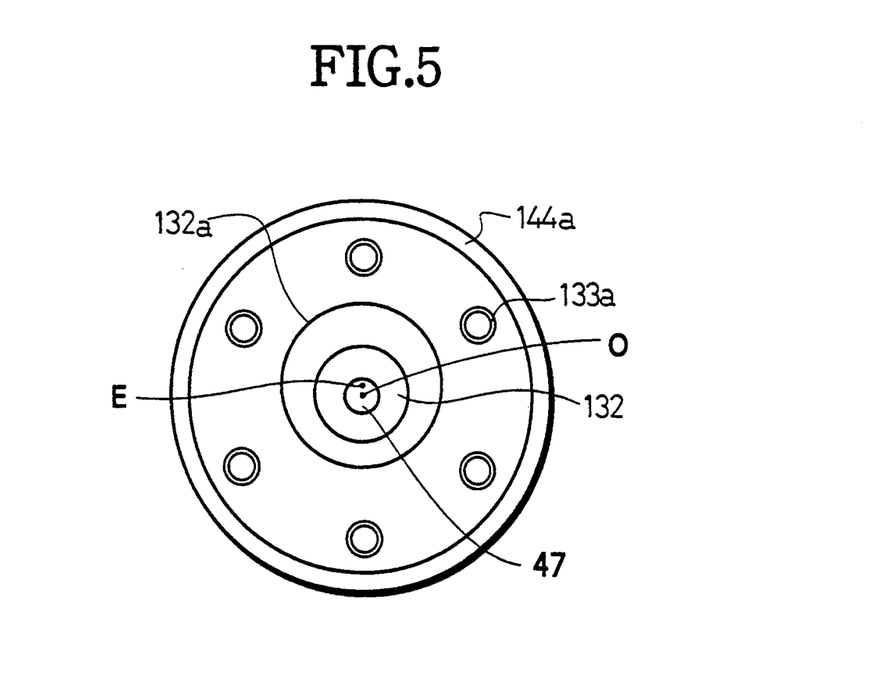
FIG. 5 is an explanatory view of a part of an actuator illustrated in FIG. 4.

Referring now to FIGS. 4 and 5, a second embodiment will be described. A structure according to this embodiment comprises the same or similar members as those of the first embodiment with the following exceptions.

In this embodiment, a fixed shaft 132 of an actuator 144 is eccentrically arranged so that the distance between the drive and driven pulleys is regulated. That is, a boss 132a, including a intermediate part defined between the fixed shaft 132 and a airtight cylinder 144a which is integrally formed with the fixed shaft 132, is formed into a column with a center E which is eccentric with respect to the center O of the airtight cylinder 144a. The boss 132a is inserted into a hole 131a provided in the flange 31. Also, the flange 31 has clearance holes into which the bolts 33 are inserted, each of which has a clearance corresponding to a distance between the centers O and E, i.e., the amount of eccentricity of the column. The reference numeral 133a represents six female screw holes which are equally spaced on the face of the airtight cylinder 44a. In order to vary the distance between the pulleys, the bolts 33 are removed and the fixed shaft 132, i.e., the airtight cylinder 144a, is then rotated by 60° and subsequently secured.

Thus, it is possible to choose the most preferable belt tension by regulating of the distance between the pulleys.

THIRD EMBODIMENT

Figure 6:
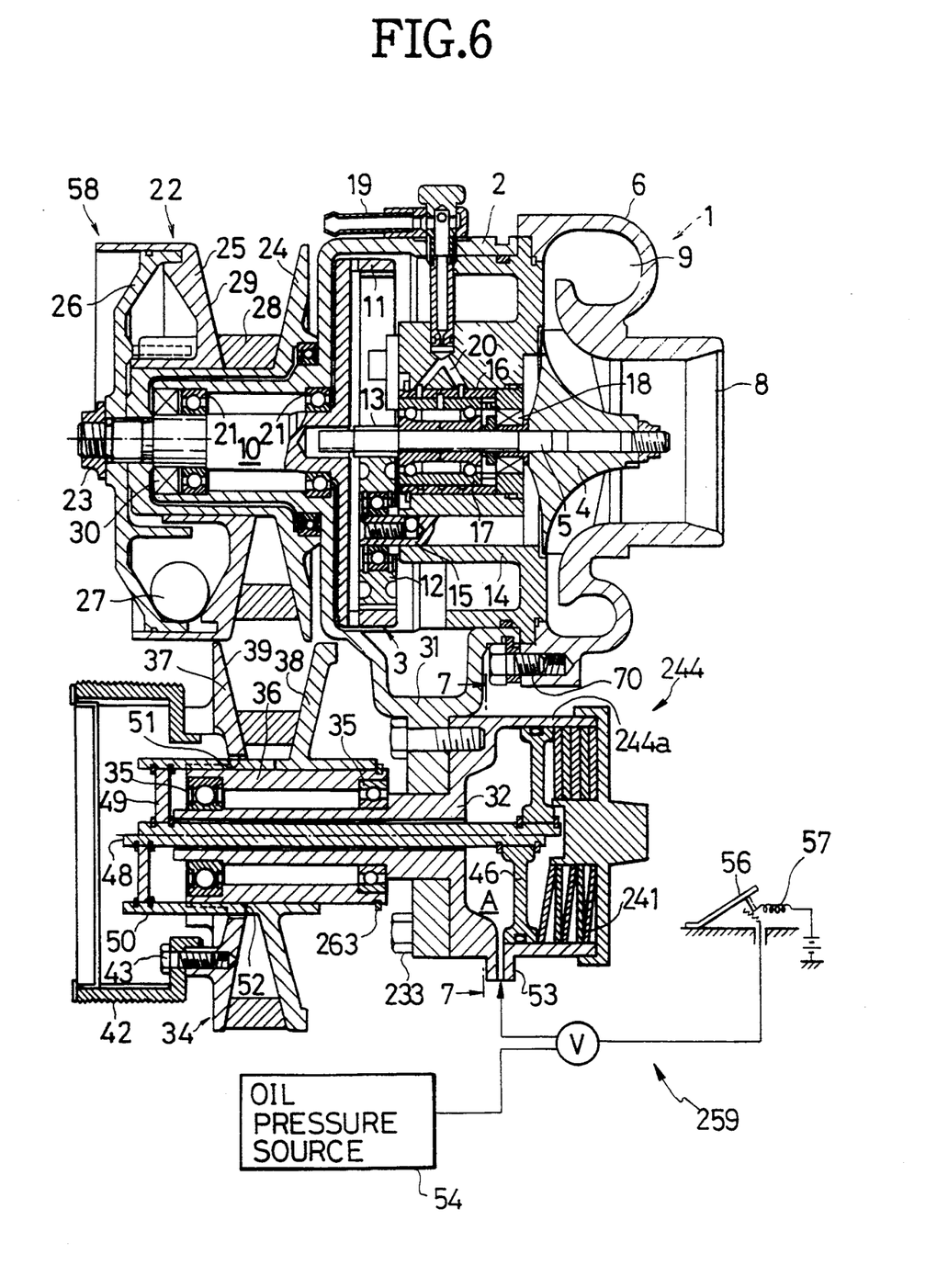
FIG. 6 is a sectional view of a supercharging device according to a third embodiment of the invention.
Figure 7:
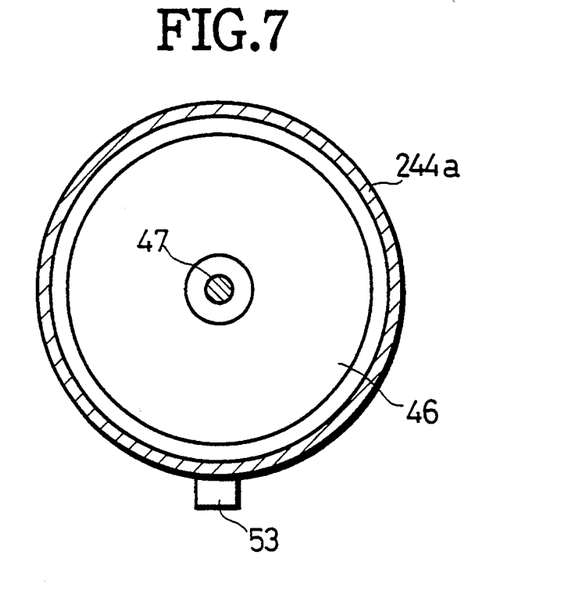
FIG. 7 is a sectional view taken substantially along the lines 7—7 of FIG. 6.
Figure 8:
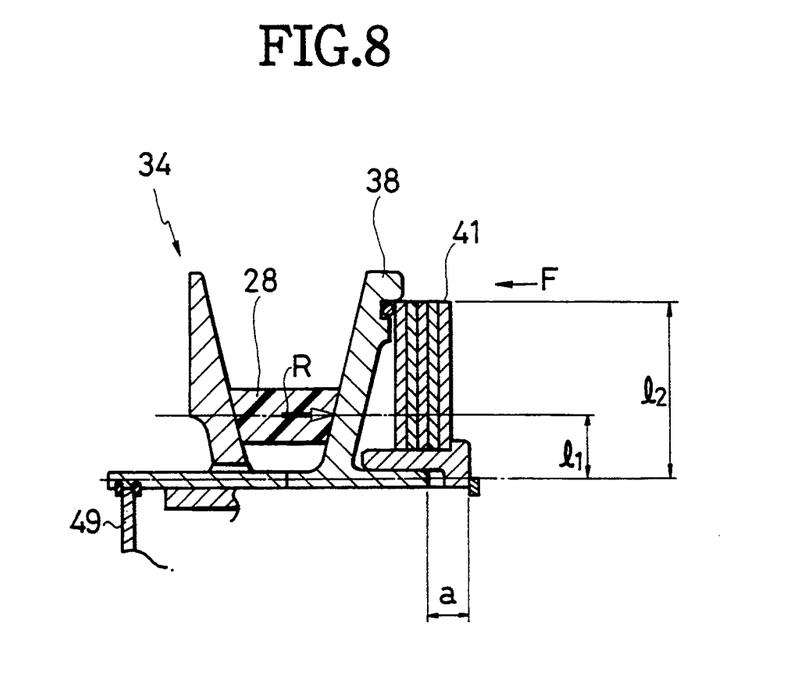
FIG. 8 is a explanatory sectional view for explaining operation differences between the supercharging devices illustrated in FIG. 1 and FIG. 6.

Referring now to FIGS. 6–8, a supercharging device 259 according to a third embodiment will be described. The supercharging device 259 comprises the same or similar members as those of the first and second embodiments with the following exceptions.

A disk spring 241 is provided inside an airtight cylinder 244a of an actuator 244 so as to press the piston 46 in a direction in which the movable flange 38 slides toward the fixed flange 37, namely to the left. A retaining ring 263 is secured to the cylindrical portion 36 so that the movable flange 38 can slide to the right along the cylindrical portion 36 until the movable flange 38 abuts against and is stopped sliding by the retaining ring 263.

Thus, although the disk spring 241 is provided inside the airtight cylinder 244a in this embodiment, the rotational frequency of the supercharger 1 is controlled by controlling the force of the disk spring 241 similarly to the supercharging devices of the first and second embodiments since the disk spring 241 presses the movable flange 38 through the piston 46, the rod 47, the thrust bearing 49, and the cylinder 51.

Merits of the supercharging device 259 compared to the supercharging device 59 of the first embodiment will be described as follows with reference to FIG. 8 illustrating a part of the supercharging device 59.

First, in the third embodiment, since the disk spring 241 is provided inside the airtight cylinder 244a of the actuator 244, there is no need to provide a space adjacent to the movable pulley 38 for slidably securing the disk spring 41. That is, the span over which the movable flange 38 in the supercharging device 259 slides is a distance "a" longer than that in the supercharging device 59.

Second, since the disk spring 241 does not rotate, there is no need of balance regulation though this is necessary for the supercharging device 59 in which the disk spring 41 rotates together with the drive pulley 34.

Third, since in the supercharging device 59 the disk spring 41 directly presses the rear face of the movable flange 38 by a load F when in the heavy or maximum load condition followed by the occurrence of an offset of $l_1$) between the load F and a load R of the belt 28 (namely a bending stress occurs in the movable flange 38), it is necessary to strengthen the movable flange 38 to overcome the offset or the bending stress. However, there is no such need in the supercharging device 259.

Fourth, in the third embodiment, since there is a relatively long distance between the piston 46 directly pressed by the disk spring 241 and the left end 48 of the rod 47 or the movable pulley 38 affected by a thrust force, even if an offset load exists in the disk spring 241, the offset load is absorbed over the long distance and does not affect the drive pulley 34.

Fifth, in the third embodiment, since the disk spring 241 is caused to contract by supplying the pressurized oil to the airtight cylinder 224a and presses against the piston 46, the load from the disk spring 241 is applied to the piston 46. However, since the piston 46 has a relatively large diameter, the load applied to the piston 46 does not create a strength problem. Further, the load of the disk spring 241 is not applied to the thrust bearing 49, thereby facilitating design of the thrust bearing 49.

What is claimed is:

1. A supercharging device for which the load can be changed by an accelerator pedal comprising:

a continuously variable transmission being driven by the engine, said transmission including a drive pulley, a driven pulley, a belt, a flyweight, and a presser member, said drive and driven pulleys having movable flanges and fixed flanges mounted on rotatable shaft members and being rotatable therewith, said belt being wound around and coupling the drive and driven pulleys, said flyweight and said presser member being provided on at least one of the drive pulley and the driven pulley, wherein said presser member includes moving means for moving a first respective movable flange toward a corresponding first fixed flange, and said flyweight displaces a second respective movable flange toward a second respective fixed flange using a centrifugal force generated therein by the rotation of said at least one pulley on which the flyweight is provided;

a mechanical type supercharger driven by said continuously variable transmission for supercharging the engine; and control means, responsive to a predetermined engine load condition, for sliding said first respective movable flange along the axis thereof away from said first respective fixed flange against the force of the presser member, wherein said control means comprises:

a pressure source;

an actuator being driven by the pressure supplied from the pressure source to slide the movable flange; and a controlling device controlling the pressure supplied to the actuator under the predetermined engine load condition.

2. A supercharging device according to claim 1, wherein the actuator comprises:

an airtight cylinder connected to the housing of the supercharger;

a piston member provided inside said airtight cylinder and capable of sliding from an applied pressure along the axis of said rotatable shaft member; and a rod member connected to said piston member and provided inside the rotatable shaft member of the drive pulley, which can be caused to slide with said piston member along said axis; and a connecting member connected with said rod member and said movable flange of the drive pulley, which can be caused to slide with said rod member along said axis, and wherein said controlling device comprises:

a valve provided between said pressure source and said airtight cylinder; and a regulator regulating the degree of opening of said valve based on a set angle of the accelerator pedal.

3. A supercharging device according to claim 2 further comprising a fixed shaft which is provided inside said rotatable shaft member of the drive pulley and extending along the axis thereof and wherein said airtight cylinder is integrally formed with said fixed shaft.

4. A supercharging device according to claim 3, wherein said flyweight is provided in the driven pulley and said presser member is provided in the drive pulley.

5. A supercharging device according to claim 4, wherein said presser member includes a disk spring.

6. A supercharging device according to claim 5, wherein said disk spring is provided adjacent to said movable flange so as to press said movable flange toward said fixed flange.

7. A supercharging device according to claim 6, wherein said fixed shaft is eccentrically arranged with respect to the center of the airtight cylinder so that the distance between the drive and the driven pulleys is regulated.

8. A supercharging device according to claim 3, wherein said disk spring is provided inside said airtight cylinder so as to press said piston member in the direction in which said movable flange slides toward said fixed flange.

* * * * *